United States Patent
Donahue (10) Patent No.: US 6,649,239 B2
(45) Date of Patent: Nov. 18, 2003

(54) REPOSITIONAL STAGGERED EDGE POSTING SHEETLETS

(75) Inventor: P. Richard Donahue, Naples, FL (US)

(73) Assignee: P. R. Donahue Incorporated, Naples, FL (US)

( * ) Notice: Subject to any disclaimer, the term of this patent is extended or adjusted under 35 U.S.C. 154(b) by 0 days.

(21) Appl. No.: 10/073,373

(22) Filed: Feb. 12, 2002

(65) Prior Publication Data

US 2003/0152732 A1 Aug. 14, 2003

(51) Int. Cl.⁷ .................................................. C09J 7/02
(52) U.S. Cl. ..................... 428/40.1; 428/41.7; 428/41.8; 428/41.9; 428/42.1; 428/42.2; 428/42.3; 428/43; 428/192; 428/194; 428/201; 428/202; 428/220
(58) Field of Search .............................. 428/40.1, 41.7, 428/41.8, 41.9, 42.1, 42.2, 42.3, 43, 192, 194, 201, 202, 220

(56) References Cited

U.S. PATENT DOCUMENTS

| | | |
|---|---|---|
| 2,030,135 A | 2/1936 | Carpenter |
| 2,647,849 A | 8/1953 | Douglas et al. |
| 3,464,842 A | 9/1969 | Jackstadt |
| 3,675,844 A | 7/1972 | Sorrell |
| 3,869,333 A | 3/1975 | McMaster |
| 4,379,012 A | 4/1983 | Heymanns |
| 4,582,737 A | 4/1986 | Torgerson et al. |
| 4,735,837 A | 4/1988 | Miyasaka et al. |
| 4,783,354 A | 11/1988 | Fagan |
| 4,950,517 A | 8/1990 | Loggins |
| 4,965,113 A | 10/1990 | Jones et al. |
| 5,202,169 A | 4/1993 | Spendlove |
| 5,401,547 A | 3/1995 | Blackwell et al. |
| 5,622,761 A | 4/1997 | Cole |
| 5,725,923 A * | 3/1998 | Luhmann .................... 428/40.1 |
| 5,766,401 A | 6/1998 | Campbell et al. |
| 6,071,583 A | 6/2000 | Pomerantz |

FOREIGN PATENT DOCUMENTS

EP  0118250  12/1984

* cited by examiner

Primary Examiner—Nasser Ahmad
(74) Attorney, Agent, or Firm—Charles R. Wilson (57) ABSTRACT

A multi-layer sheet has individual staggered edge posting sheetlets in a side-by-side relationship. The multi-layer sheet comprises a base release sheet, the posting sheetlets in a flat sheet form, and a removable cover sheet. The posting sheetlets are loosely held together in a manner whereby an individual posting sheetlet is easily removed and used as a base. Each posting sheetlet in the multi-layer sheet has a paper substrate with an adhesive partially covering each face thereof in approximate aligned areas of the respective faces. A front face or a back face of the individual posting sheetlet is adhered to a surface while an opposed face holds an item for posting. In use, an individual posting sheetlet is readily removed from the multi-layer sheet and a cover panel removed from the posting sheetlet to fully expose the front face and the back face of the individual posting sheetlet.

19 Claims, 8 Drawing Sheets

REPOSITIONAL STAGGERED EDGE POSTING SHEETLETS

FIELD OF THE INVENTION

This invention relates to posting sheetlets in a multi-layer sheet form. More particularly, the invention relates to a multi-layer sheet of individual easily removable repositional posting sheetlets.

BACKGROUND OF THE INVENTION

Sheetlets, particularly of paper, are manufactured for a wide variety of home and office purposes. They can serve as file labels, address labels, page markers, note pads, and numerous other everyday and occasional uses. The sheetlets come in various colors, sizes, and forms. A common trait is that all must be produced economically and all must be convenient to use.

A potential use for sheetlets is in the posting of items in the home and office. Many people are in the habit of posting notes, appointment cards, children's artwork, messages, grocery lists, emergency telephone numbers, invitations and other informational-type items in a central home or office location. Bulletin boards and thumb tacks, of course, have long been used for posting items. The homeowner may use a refrigerator door or other large metallic surface area and refrigerator magnets for temporarily holding the items. Adhesive tape can also be used to tape edges or corners of the item to the substrate. A double sided tape is also occasionally used. Such means of posting an item for later referencing are convenient, though can be somewhat cumbersome to use.

Any sheetlet for posting purposes must be specially designed with performance, economics, and ease of useability of paramount importance. In accord with a need, there has been developed a multi-layer sheet of a plurality of individual posting sheetlets, each posting sheetlet of which can be used to form a base for adhering an item thereto. The multi-layer sheet lends itself well to manufacturing and assembly in an economical fashion. The multi-layer sheet is economical to produce, its use is easily understood, and the posting sheetlets are easily separated from the multi-layer sheet as needed and used for their intended purpose.

SUMMARY OF THE INVENTION

A multi-layer sheet has individual posting sheetlets with staggered edges which permits each individual posting sheetlet to be readily removed. The multi-layer sheet comprises a base release sheet, a removable cover sheet made of individual cover panels, and a set of individual posting sheetlets positioned in between the base release sheet and removable cover sheet. Each of the posting sheetlets has a paper substrate with a front face and a back face. An adhesive partially covers each face of each individual posting sheetlet in approximate aligned areas thereof. The adhesive on the back face of the posting sheetlet allows the posting sheetlet to be adhered to a substrate. The adhesive on the front face of the posting sheetlet is to receive and hold an item for posting. An adhesive-free area on each individual posting sheetlet is utilized for grasping by the user. Further, commonly positioned edges of the base release sheet, cover sheet and posting sheetlets are staggered from one another to facilitate separation and removal of each cover panel and each posting sheetlet.

DETAILED DESCRIPTION OF THE INVENTION

The multi-layer sheet of individual posting sheetlets of the invention is particularly useful in a home setting and in an office setting. It is, for this reason, described in these settings in the following paragraphs. It can as well be used in an industrial setting or wherever there is a need to temporarily post a lightweight item for referencing purposes.

Figure 6:
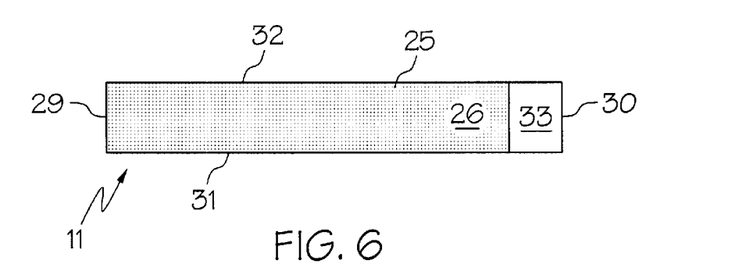
FIG. 6 is a top plan view of an individual posting sheetlet taken from the multi-layer stack of FIG. 1.
Figure 7:
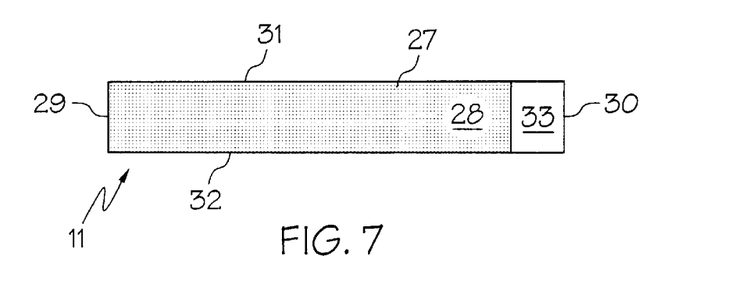
FIG. 7 is a bottom plan view of the individual posting sheetlet of FIG. 6.
Figure 19:
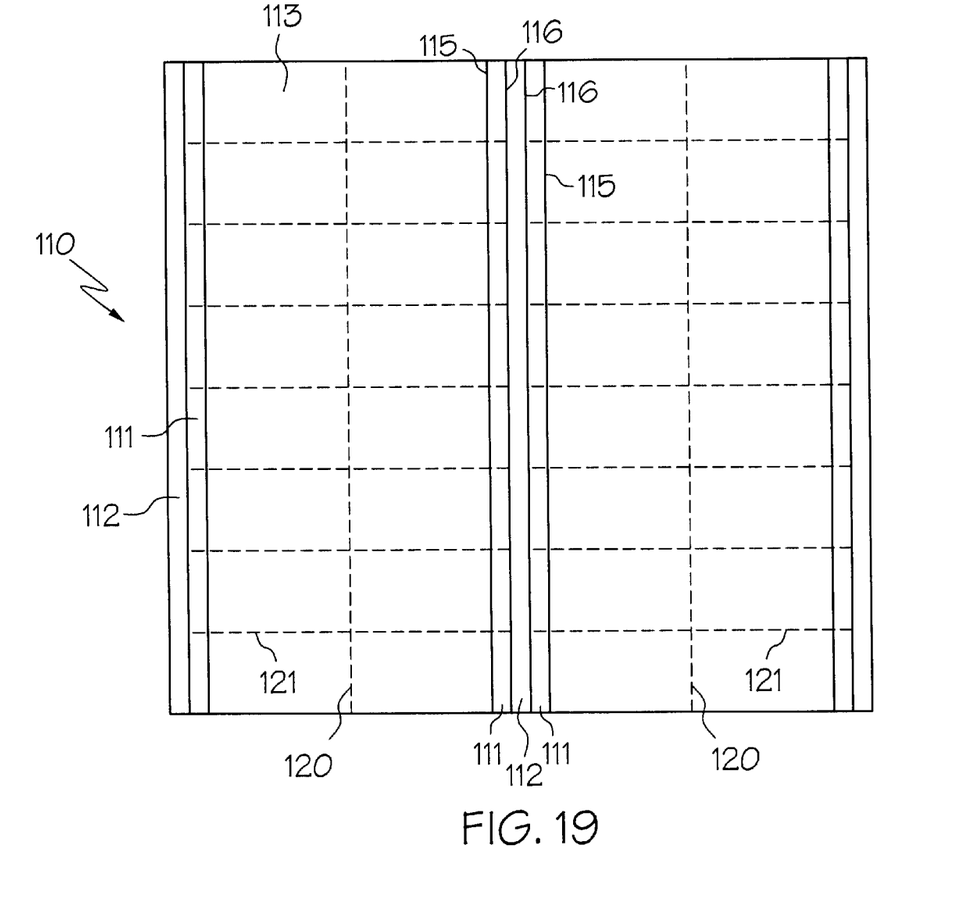
FIG. 19 is a top plan view of a four column multi-layer sheet of the invention showing staggered edge individual posting sheetlets.
Figure 20:
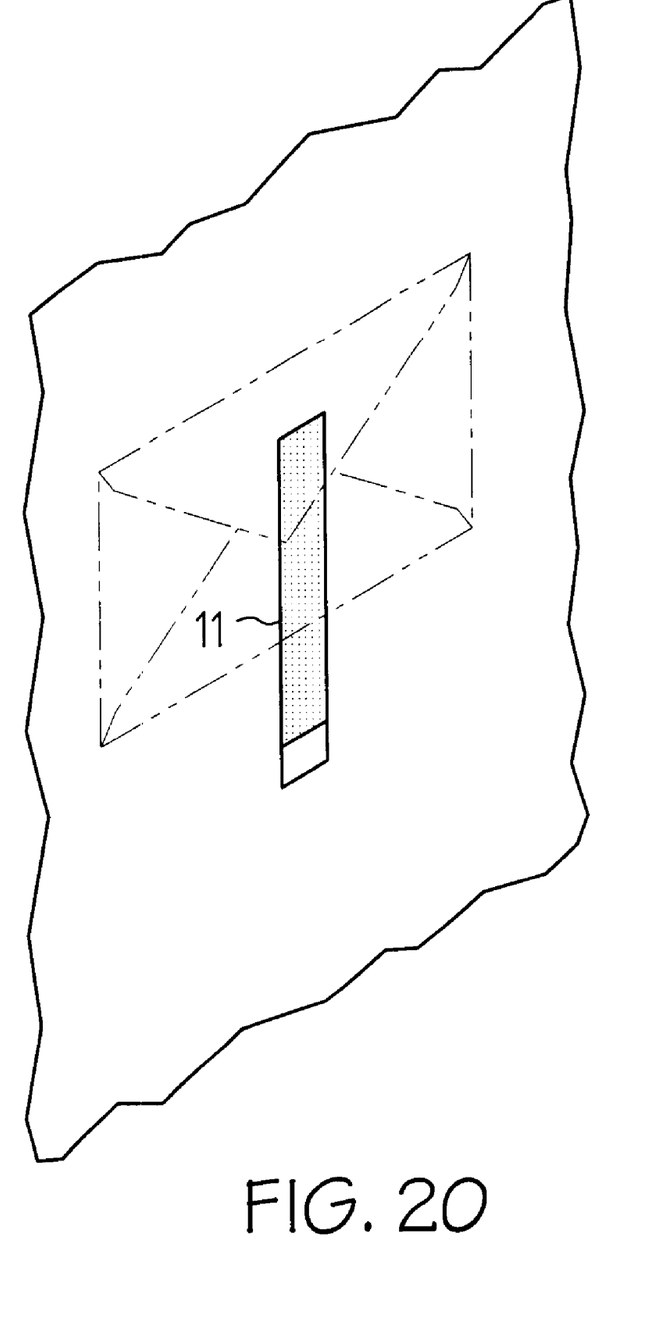
FIG. 20 is an environmental view in perspective showing use of a posting sheetlet taken from the multi-layer sheet of FIG. 1.

FIGS. 1–5 show a multi-layer sheet of several individual posting sheetlets. FIGS. 8–18 show alternative staggered edge embodiments of the multi-layer sheet. FIG. 19 shows an alternative multi-layer sheet embodiment. FIGS. 6, 7 and 20 show an individual posting sheetlet taken from the multi-layer sheet of FIG. 1 and a use of it.

Figure 1:
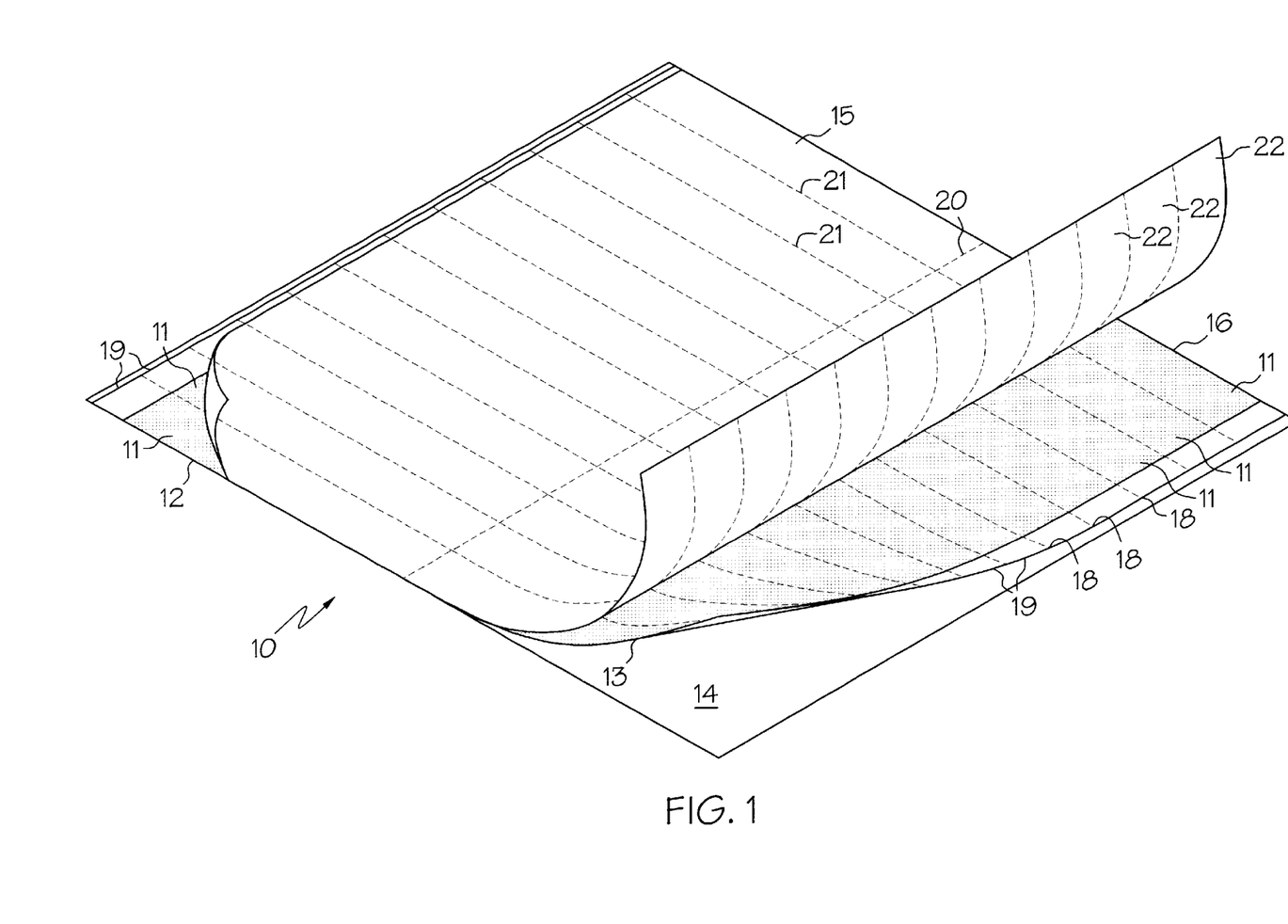
FIG. 1 is a perspective view of the multi-layer sheet of the invention with a removable cover sheet partially peeled back to reveal two columns of staggered edge individual posting sheetlets.
Figure 2:
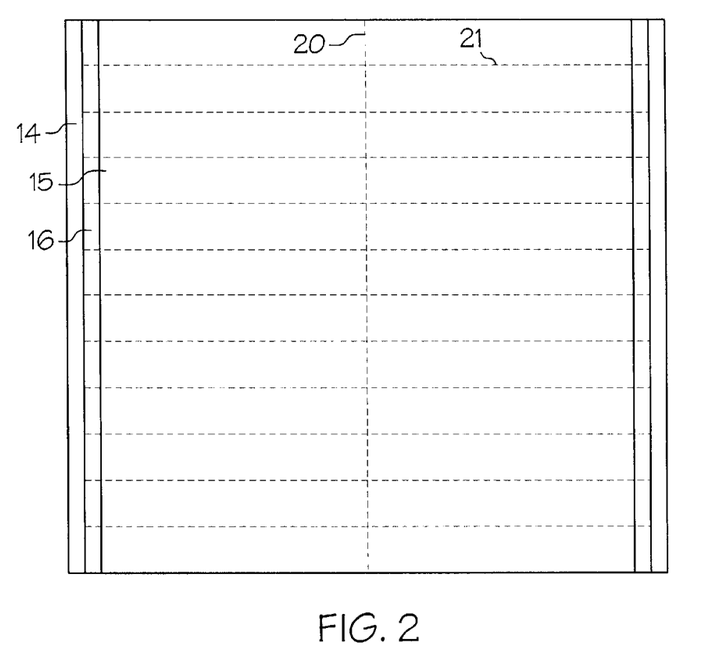
FIG. 2 is a top plan view of the multi-layer sheet of FIG. 1.
Figure 3:
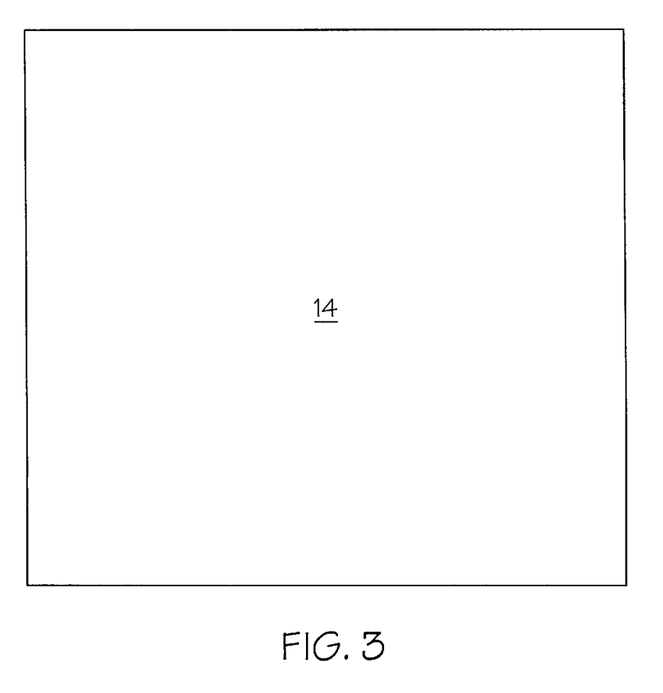
FIG. 3 is a bottom plan view of the multi-layer sheet of FIG. 1.

With reference to FIG. 1, there is shown a multi-layer sheet 10 of the invention. The multi-layer sheet 10 is comprised of a plurality of individual uniformly shaped posting sheetlets 11 in substantially flat sheet form. Each of the individual posting sheetlets is defined by a paper substrate with opposed adhesive covered areas. The posting sheetlets 11 are in a side-by-side relationship to form a first column 12 of twelve posting sheetlets and a second column 13 of twelve posting sheetlets. While not shown, a single column format of posting sheetlets can be used in formation of the multi-layer sheet of the invention. A tri-column or greater format of posting sheetlets is also feasible as discussed below and illustrated in FIG. 19.

Still with reference to FIG. 1, a base release sheet 14 and a removable cover sheet 15 are included on bottom and top respectively of the posting sheetlets for packing reasons. The collective twenty-four posting sheetlets represent a full sheet 16. A vertical severance line 17 (seen in FIG. 4) extends vertically down the middle of the sheet 16 to form the two columns. As discussed later, horizontal severance lines 18 (seen in FIG. 1) extend from the vertical severance line 17 to opposed staggered edges 19 of the full sheet 16.

The base release sheet 14 normally remains in place until the multi-layer sheet is depleted of its individual posting sheetlets. The removable cover sheet 15 is scored or perforated to create a centrally disposed vertical severance line 20 overlying the vertical severance line of the full sheet 16 and spaced horizontal severance lines 21 overlying the horizontal severance lines 18 of the full sheet 16. The severance lines 20 and 21 create cover panels 22 which can be separated from the balance of the cover sheet and from the underlying individual posting sheetlets as each is used.

The several individual posting sheetlets 11 of the multi-layer sheet 10 are typically used one at a time. In accord with the invention, a peripheral edge of each of the posting sheetlets is offset from the edge directly over it of an overlying cover panel and also offset from the edge directly under it of an underlying base release sheet. The collective commonly positioned edges are on an outside or free side of the multi-layer sheet. The resultant staggered edges greatly facilitate removal of a cover panel and removal of a posting sheetlet for use. The staggered edges can assume any one of many shapes. They can be parallel to the cover sheet's vertical severance line 20, perpendicular to the vertical severance line 20, obliquely angled to the vertical severance line 20 or curved. The full sheet 16 of individual posting sheetlets, base release sheet 14 and removable cover sheet 15 in the multi-layer sheet 10 are discussed separately and in more detail in the following paragraphs.

The size and shape of the full sheet 16 made up of the individual posting sheetlets 11 are not critical. For manufacturing and packaging purposes, the full sheet 16 and the individual posting sheetlets 11 are both preferably rectangular-shaped or square-shaped. As shown in FIG. 1, each posting sheetlet 11 is rectangular-shaped and all the posting sheetlets are equally sized. If desired, the posting sheetlets in one column can be one size and the posting sheetlets in the other column can be another size, provided the full sheet is still rectangular-or-square-shaped. Severance lines 17 and 18 and staggered edges 19 of the full sheet 16 define the individual posting sheetlets 11. The severance lines can be perforated for easy tearing or full cuts, extending fully through the sheet 16.

Each posting sheetlet 11 ranges from about one-fourth inch to about six inches in width, as measured along the columns and about one inch to about five inches in length, as measured from the vertical severance line 20 to the staggered edge 19. A preferred posting sheetlet ranges from about one-fourth inch to about one and one-half inch in width and about one inch to about three inches in length. Posting sheetlets with the narrow width are preferred due to reduced manufacturing costs, enhanced ease of use by the consumer, and desired inconspicuous product use. Larger sized posting sheetlets are feasible, dependent only on the intended use and are contemplated in this invention. Such larger sized posting sheetlets, though, tend to be for very specialized uses as found in an industrial setting.

Each posting sheetlet 11 in the multi-layer sheet 10 is defined by a paper sheet having opposed adhesive-bearing surfaces. As best seen in FIGS. 6 and 7, an individual posting sheetlet 11 taken from the multi-layer sheet 10 has a front face 25 with an adhesive 26 covering a portion of it and a back face 27, also with an adhesive 28 covering a portion of it. The front face 25 and the back face 27 are facing in opposite directions. There is a top edge 29, a bottom edge 30 spaced from the top edge and a pair of laterally spaced side edges 31 and 32 extending between the top and bottom edges. A posting sheetlet taken from the other column of the full sheet is identical, other than its adhesive-free area being on the opposite side.

Figure 4:
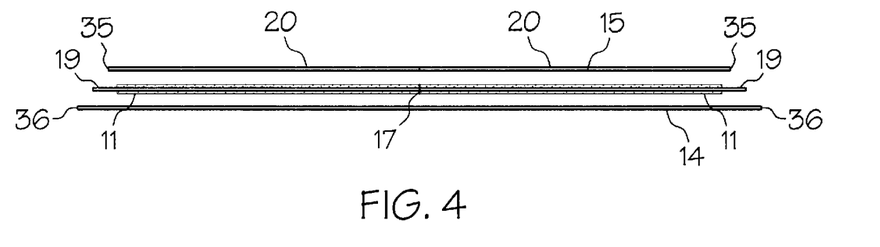
FIG. 4 is an exploded side view in elevation of the multi-layer sheet of FIG. 1 showing staggered edges of a base release sheet, a removable cover sheet of two cover panels and two individual posting sheetlets in a side-by-side relationship.
Figure 5:
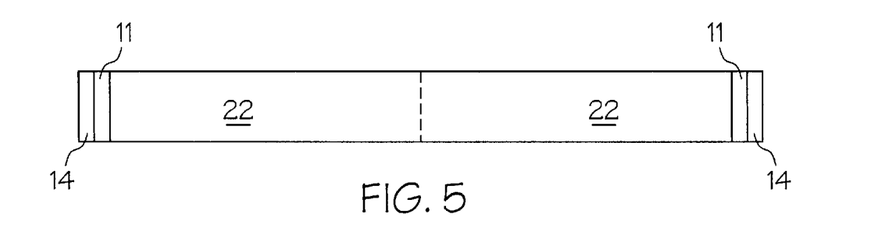
FIG. 5 is a top plan partial view of the multi-layer sheet of FIG. 4 showing the two cover panels of the cover sheet, the two individual posting sheetlets and the base release sheet.

The adhesives 26 and 28 on the individual posting sheetlets 11 partially cover the respective front face 25 and back face 27 and are firmly adhered thereto. The adhesives are depicted in FIG. 4 as defined layers, though it should be understood the layers may have varying thicknesses and continuity throughout. It is important for the adhesive to not fully cover the faces in that the individual posting sheetlets are then more difficult to grasp and to remove from the multi-layer sheet during use. The adhesives 26 and 28 are positioned on approximate aligned areas of the respective faces of the posting sheetlets 11.

Preferably, each adhesive on the posting sheetlets extends fully across the width of the faces, from side edge 31 to side edge 32. Preferably, each adhesive also extends continuously down from the top edge 29 to about 70% to about 95% of the posting sheetlet's length, more preferably from about 80% to about 90% of the sheet's length to terminate inwardly of the bottom edge 30. A termination line is created which is substantially parallel with the bottom edge 30. An adhesive-free area 33 of about one-quarter inch to about three-quarters inch at the bottom of the posting sheetlet on both sides is created as a handle for grasping purposes. It has been found the preferred adhesive placement optimizes removal of posting individual sheetlets from the multi-layer sheet and actual use of the individual posting sheetlets. Posting sheetlets which are fully covered on both sides by an adhesive are difficult to individually grasp and remove from the multi-layer sheet. Conversely, too small of an adhesive area will adversely affect the ability of the individual posting sheetlet to adhere to a substrate and/or to adequately hold an item to be posted.

The adhesive must have a degree of adhesion sufficient to stick to a substrate and an item to be posted, yet be releasable. Additionally, the adhesive must not leave a sticky residue. Pressure-sensitive adhesives are commercially available and ideally suited herein. Highly preferred are hot melt adhesives and water-based acrylic adhesives which are applied as microspheres onto the posting sheetlets. The adhesive is applied at a level to give a dried adhesive of from about 0.4 mil to about 1 mil, preferably about 0.6 mil in thickness. Application of the adhesive as microspheres on properly sized paper is done by conventional well known methods.

The acrylic adhesive when applied as microspheres and at the proper thickness results in a degree of adhesion of from about 100 grams to about 150 grams per linear inch, preferably about 125 grams to about 135 grams per linear inch using test criteria published by the Pressure Sensitive Test Council (PSTC-1). It is theorized that the proper degree of adhesion results from the form of the adhesive, i.e. microspheres as opposed to a coalesced film, and proper thickness of adhesive, i.e. about 0.4 mil to about 1 mil.

The number of individual posting sheetlets in a multi-layer sheet can vary widely. For practical purposes, each full sheet of the multi-layer sheet has at least about six individual posting sheetlets. Preferably, from about ten posting sheetlets to about thirty posting sheetlets form a full sheet, comprising a part of the multi-layer sheet.

With reference to FIG. 1 and as most evident in FIG. 4, the staggered edges 19 of the individual posting sheetlets 11 are offset from the commonly positioned edges 35 of the overlying cover panels 20 and commonly positioned edges 36 of the base release sheet 14. The edges 19, 35 and 36 are straight cut edges parallel to the vertical severance lines 17 and 20 of the full sheet 16 and cover sheet 15, respectively and parallel to one another. This edge configuration greatly facilitates separation of a cover panel from an underlying individual posting sheetlet and removal of that posting sheetlet from both the cover panel and the base release sheet. As should be evident, the adhesive areas of the individual posting sheetlets are fully covered by the cover sheet and base release sheet. Grasping of adhesive-free areas and minor finger manipulations are all that is needed to free the posting sheetlet for use.

The base release sheet 14 and the removable cover sheet 15 are releasably attached to the full sheet 16 of individual posting sheetlets 11. The base release sheet 14 is releasably attached, through the adhesive on the back face of the posting sheetlets. The base release sheet 14 has a shape similar to that of the full sheet 16 of individual posting sheetlets and a size slightly different in one dimension due to the staggered edges. The removable cover sheet 15 is releasably attached to the several posting sheetlets through the front face adhesive on the individual posting sheetlets. The removable cover sheet has a size and a shape to completely cover the upper layer of pressure-sensitive adhesive on the full sheet of posting sheetlets and to extend at least partially over the adhesive-free area of the front face of the posting sheetlets. As evident in FIGS. 1 and 2, the removable cover sheet 15 is scored to create multiple cover panels 22. Each cover panel 22 substantially coincides in size and shape with an underlying individual posting sheetlet 11. The severance lines 20 and 21 can be perforations as shown which require some tearing to fully remove a cover panel 22 from the balance of the cover sheet 15. The severance lines can also be continuous and fully cut so that a mere lifting of one of the cover panels 22 is all that is required to reveal the underlying individual posting sheetlet 11.

Release substrates of various natures are commercially available and are used in the invention for the base release sheet and removable cover sheet. For example, either sheet can be a wax coated paper sheet, silicone-coated paper sheet, or a plastic sheet such as a polyethylene terephthalate (available as Mylar sheet) or any other plastic sheet made from synthetic polymeric resin with non-stick physical characteristics. Highly preferred base release sheets and cover sheets are made from supercalendered kraft paper which has been silicone-coated on the side which faces the adhesive-bearing surface of the posting sheetlets.

Figure 8:
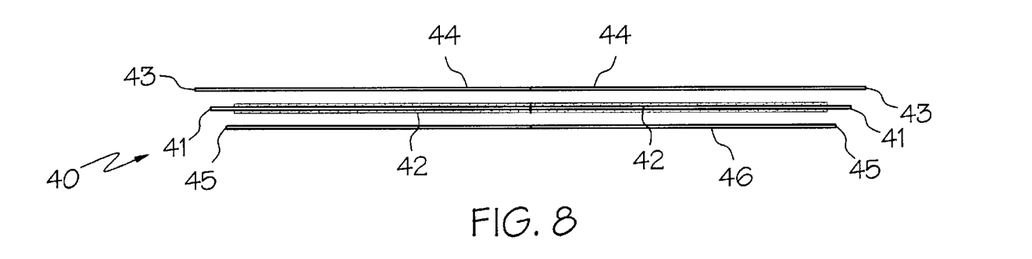
FIG. 8 is an exploded side view in elevation of a staggered edge multi-layer sheet of the invention showing two side-by-side individual posting sheetlets with a base release sheet with underlapping edges and a cover sheet of two cover panels with overlapping edges.
Figure 9:
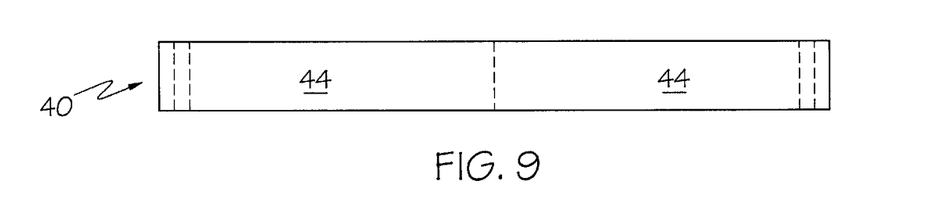
FIG. 9 is a top plan partial view of the multi-layer sheet of FIG. 8 with underlapping staggered edges shown in phantom.

FIGS. 8 and 9 illustrate a multi-layer sheet 40 also with parallel commonly positioned staggered edges offset from one another. The edges 41 of the posting sheetlets 42 underlap the edges 43 of the cover panels 44. Further, the posting sheetlet edges 41 overlap the edges 45 of the base release sheet 46.

Figure 10:
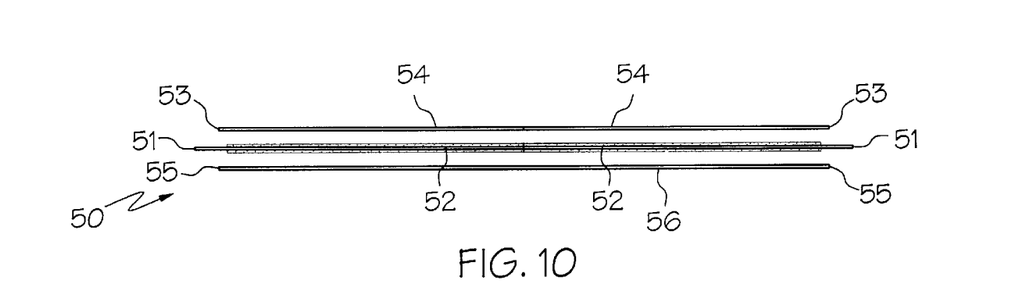
FIG. 10 is an exploded side view in elevation of a staggered edge multi-layer sheet of the invention showing two side-by-side individual posting sheetlets, a base release sheet with underlapping edges and a cover sheet of two cover panels with underlapping edges.
Figure 11:
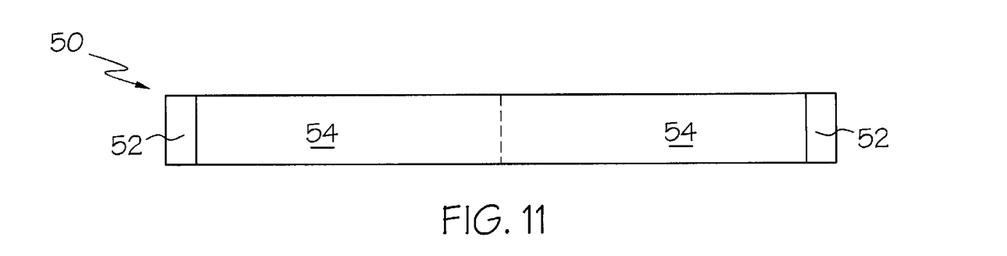
FIG. 11 is a top plan partial view of the multi-layer sheet of FIG. 10.

The multi-layer sheet 50 seen in FIGS. 10 and 11 has edges 51 of the posting sheetlets 52 which overlap both the edges 53 of the overlying cover panels 54 and the edges 55 of the underlying base release sheet 56. The amount of overlap in such that the adhesive on the back and front faces of the posting sheetlet is always covered by the cover panels 54 and base release sheet 56.

Figure 12:
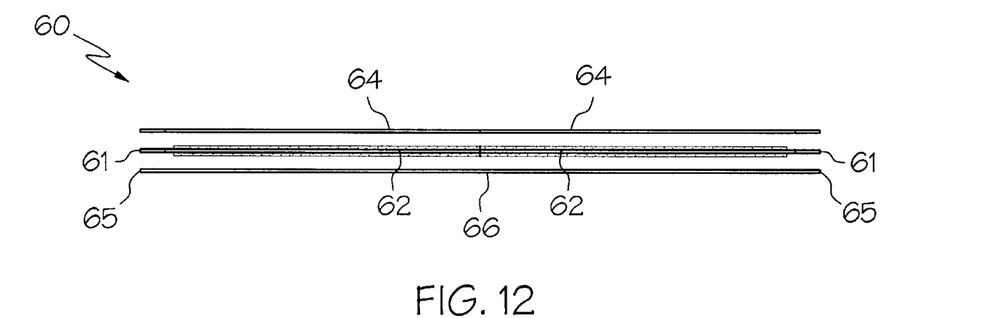
FIG. 12 is an exploded side view in elevation of a staggered edge multi-layer sheet of the invention showing two side-by-side individual posting sheetlets with horizontal cut staggered edges and a cover sheet of two cover panels with horizontal cut underlapping staggered edges.
Figure 13:
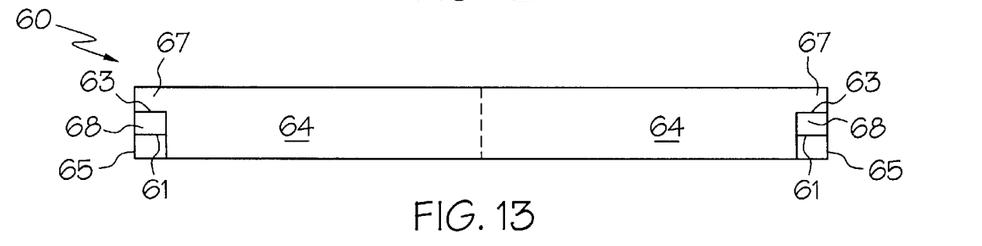
FIG. 13 is a top plan partial view of the multi-layer sheet of FIG. 12.

FIGS. 12 and 13 depict two posting sheetlets from a multi-layer sheet 60 where staggered edges of the posting sheetlets and cover panels are at a right angle to a peripheral edge of the sheet 60. As best seen in FIG. 13, staggered edges 61 of posting sheetlets 62 and staggered edges 63 of cover panels 64 are cut at right angles to extend inwardly from a peripheral edge 65 of the base release sheet 66 to create tabs 67 and 68 which are offset from one another. The cover panel tab 67 overlies the posting sheetlet 62. The tab 68 on each posting sheetlet 62 is easily grasped to remove the posting sheet from the multi-layer sheet. The base release sheet 66 is uncut.

Figure 14:
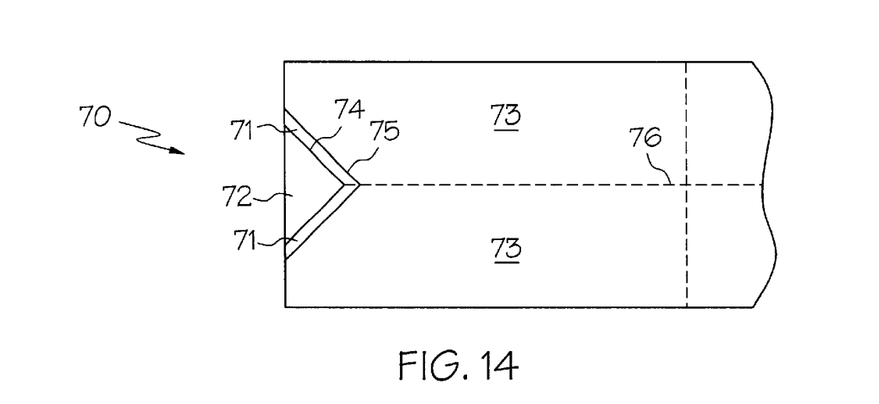
FIG. 14 is a top plan partial view of a staggered edge multi-layer sheet of the invention showing two adjacent posting sheetlets with internal oblique angled staggered edges and cover panels with commonly positioned underlapping oblique angled edges.
Figure 15:
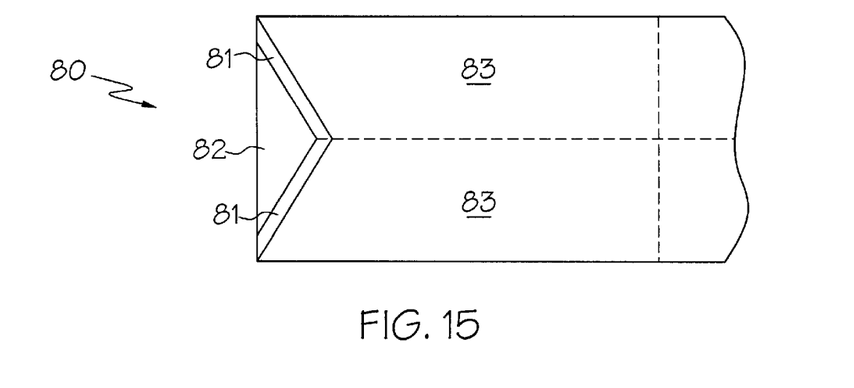
FIG. 15 is a top plan partial view of another multi-layer sheet of the invention showing two adjacent posting sheetlets with oblique angled staggered edges extending inwardly from outermost corners of the adjacent posting sheetlets and cover panels with commonly positioned underlapping oblique angled edges.
Figure 16:
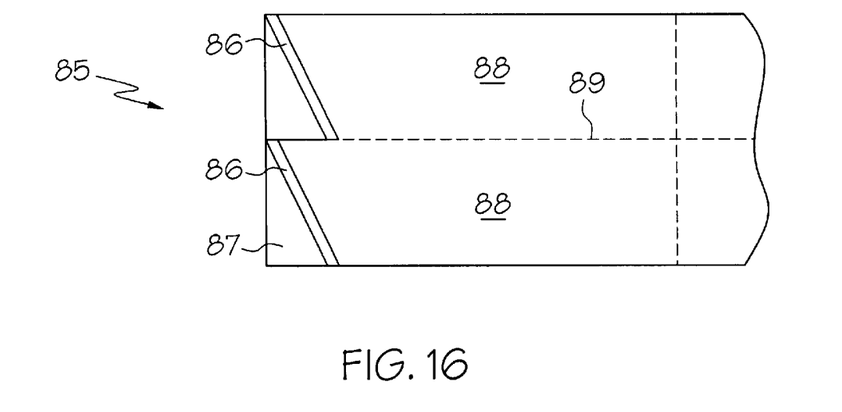
FIG. 16 is a top plan partial view of a staggered edge multi-layer sheet of the invention showing two adjacent posting sheetlets with oblique angled staggered edges extending from an upper corner of each posting sheetlet internally to a severance line and cover panels with commonly positioned parallel underlapping staggered edges.

The edges of the three sheets of the multi-layer sheets of the invention discussed above are all straight edge cuts which at least in part parallel edges of the base release sheet. It should be understood the edges can be cut in any manner provided they are staggered. For example, the edges can be cut on an oblique angle as depicted in FIGS. 14–16. With respect to FIG. 14, the multi-layer sheet 70 has posting sheetlets 71, base release sheet 72 and cover panels 73. Commonly positioned posting sheetlet edge 74 and cover panel edge 75 are angled inwardly at an approximate mid-point from a peripheral edge of the multi-layer sheet to a severance line 76 dividing the two cover panels. The cover panel edge 75 underlaps the posting sheetlet edge 74.

With respect to FIG. 15, the multi-layer sheet 80 has posting sheetlets 81, base release sheet 82 and cover panels 83 also with oblique cut staggered edges. In the embodiment of FIG. 15, the oblique cut edges extend from near an upper corner of one cover panel to a severance line and from near a lower corner of an adjacent cover panel to the same severance line. As seen in FIG. 16, a multi-layer sheet 85 has posting sheetlets 86, a base release sheet 87 and cover panels 88. Edges of the posting sheetlets and the cover panel are both cut at an angle which extends from an upper corner to a severance line 89 dividing two adjoining cover panels 88 and are staggered with the cover panel edges underlapping the posting sheetlet edges.

Figure 17:
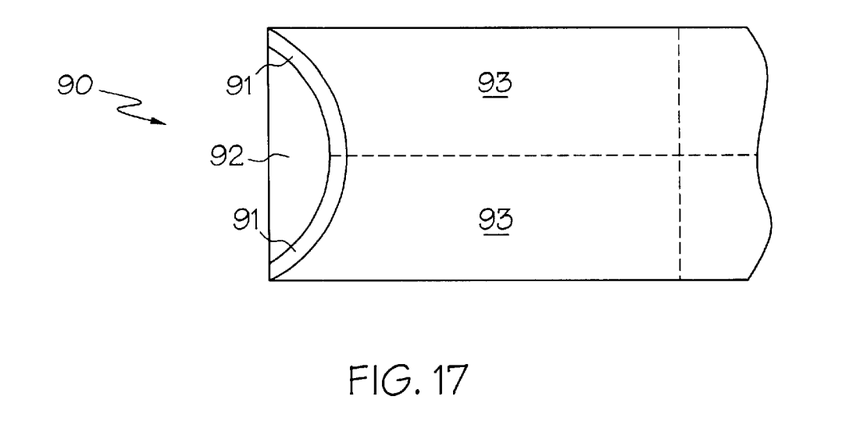
FIG. 17 is a top plan partial view of a staggered edge multi-layer sheet of the invention showing two adjacent posting sheetlets with curved staggered edges and cover panels with commonly positioned underlapping curved edges.

The edges can also be curved as seen in FIG. 17. The multi-layer sheet 90 has posting sheetlets 91, base release sheet 92 and cover panels 93. The staggered edges of the posting sheetlets and cover panels form a curve extending from an upper corner of one cover panel to a lower corner of an adjoining cover panel. In all cases, there is an overlap or underlap of the cover panel edges and posting sheetlet edges to facilitate grasping. Additionally, the adhesives of the posting sheetlet are fully covered by the cover sheet and base release sheet.

Figure 18:
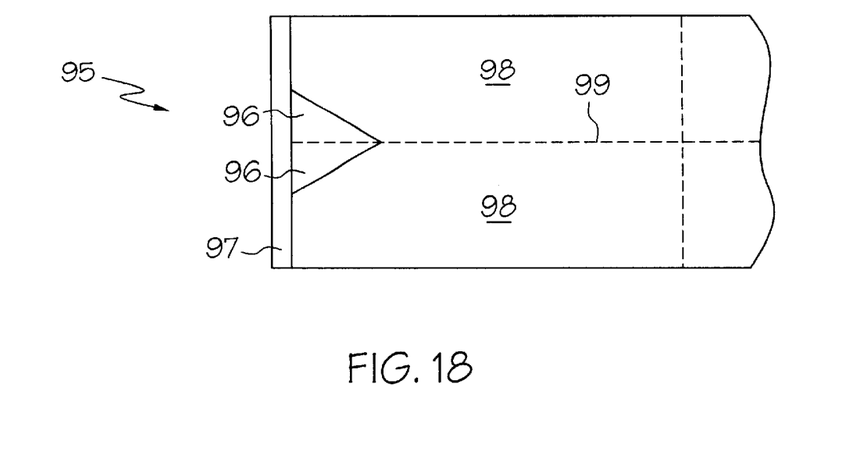
FIG. 18 is a top plan partial view of a multi-layer sheet of the invention showing two adjacent posting sheetlets with staggered edges which parallel a peripheral edge of a base release sheet and cover panels with oblique angled staggered edges which terminate at a common severance line.

FIG. 18 depicts a multi-layer sheet 95 wherein there are staggered vertical edges on posting sheetlets 96, a base release sheet 97 and a combination straight/oblique edges on cover panels 98. As shown, each cover panel has a straight edge overlying a straight edge of an underlying posting sheetlet to a mid-point and then the oblique angled edge extending inwardly to a severance line 99.

FIG. 19 illustrates an embodiment of the invention wherein four columns of adjacent posting sheetlets are provided to form a multi-layer sheet 110. The full sheet 111 of individual posting sheetlets, base release sheet 112, and cover sheet 113 are the same as the corresponding components of the multi-layer sheet depicted in FIG. 1 and discussed above. Further, the internal columns of cover panels and posting sheetlets have staggered edges 115 and 116 respectively to facilitate their separation and removal from the multi-layer sheet. The peripheral edges of the cover panels underlap those of the underlying posting sheetlets. Vertical severance lines 120 and horizontal severance lines 121 apparent in the cover sheet 113 and extending through the underlying full sheet 111 create the cover panels and individual posting sheetlets. Other shaped edges can be used. Also, additional columns can extend across the sheet, e.g. up to twelve columns.

In use, the home owner or office worker who desires to post an item simply grasps an individual posting sheetlet from the multi-layer sheet and pulls it therefrom. An overlying cover panel is either removed prior to separating the posting sheetlet from the multi-layer sheet or subsequent to the posting sheetlet being removed. As seen in FIG. 20, the posting sheetlet 11 taken from the multi-layer sheet 10 depicted in FIG. 1 is then placed on a substrate in a convenient location. Either face of the posting sheet can be adhered to the substrate with the opposed face exposed for further use. It can be used as is by writing on it. In accord with the primary focus of the invention, an item such as an envelope to be posted is placed in contact with the adhesive on the opposed face of the posting sheetlet. It remains there for an indefinite time. In due course, the homeowner or office worker removes the item and reuses the posting sheetlet or simply removes and discards it also. Whenever another posting sheetlet is needed, the home owner or office worker simply removes and discards one of the other scored cover sheet panels to expose the next posting sheetlet. That posting sheetlet is removed from the multi-layer sheet and used as described above with respect to the first posting sheetlet.

The multi-layer posting sheetlet of the invention can be modified in various manners for specialized uses. For example, the degree of adhesion of the adhesive on the back face can be greater than the degree of adhesion on the front face of each individual posting sheetlet to better ensure that removal of a posted item from a sheet adhered to a surface will leave the sheetlet in place. A hole can be punched into the multi-layer sheet near a top center area for mounting purposes. Also, the adhesive-free areas of each posting sheetlet can be sufficiently large to receive penciled or penned notes.

Features can be added to enhance the multi-layer sheet's marketing appeal. For example, the three layers of sheets can be color coded to better identify each layer. Printing can be added to the different layers. Thus, the cover panel can have printed on it a part of a message, a saying or a question. The underlying posting sheetlet can have printed on it the balance of the message, saying or an answer. The printings can as well be on the base release sheet. Another marketing feature is the addition of an image alone or along with printed matter. One example of this feature is to print on a cover panel a mid-day photo of a beach scene and also print on an underlying release sheet a twilight photo of the same beach scene. The two scenes would signify the passage of time as the cover panel and posting sheetlet are removed from the multi-layer sheet.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

I claim:

1. A multi-layer sheet of staggered edge individual posting sheetlets held together in a manner to maintain the integrity of the multi-layer sheet during non-use and to allow the ready removal of each posting sheetlet from the multi-layer sheet during use for adhering to a substrate so as to provide a base for temporarily posting an item, said multi-layer sheet comprising:

(a) a base release sheet having peripheral edges;

(b) a plurality of individual adjacent posting sheetlets in flat sheet form overlying the base release sheet, each said posting sheetlet having a paper substrate with a front face and a back face with (i) a peripheral edge, (ii) an exposed adhesive partially covering each said face in approximate aligned areas of the front face and the back face so as to be opposed one another, and (iii) an adhesive-free area on each said face in approximate aligned areas of the respective faces and further the adhesive-free area extends inwardly from the peripheral edge of the posting sheetlet and still further the peripheral edge of each said posting sheetlet is offset from an underlying peripheral edge of the base release sheet to facilitate grasping each said posting sheetlet; and (c) a removable cover sheet overlying the individual posting sheetlets, said cover sheet having severance lines which overlie edges defining the individual posting sheetlets to form a plurality of cover panels equal in number to the individual posting sheetlets wherein each of said cover panels overlies each of said individual posting sheetlets and further each of said cover panels has a peripheral edge offset from the peripheral edge of the underlying individual posting sheetlet to enhance manipulative access to the adhesive-free area of the individual posting sheetlet, whereby each cover panel and each posting sheetlet is available for ready grasping and removing from the multi-layer sheet.

2. The multi-layer sheet of claim 1 wherein the peripheral edge of each cover panel extends over the peripheral edge of the underlying individual posting sheetlet in an overlapping fashion.

3. The multi-layer sheet of claim 1 wherein the peripheral edge of each cover panel extends under the peripheral edge of the underlying individual posting sheetlet in an underlapping fashion.

4. The multi-layer sheet of claim 1 further wherein a peripheral edge of the base release sheet extends under the peripheral edge of the overlying individual posting sheetlet in an underlapping fashion.

5. The multi-layer sheet of claim 1 further wherein a peripheral edge of the base release sheet extends over the peripheral edge of the overlying individual posting sheetlet in an overlapping fashion.

6. The multi-layer sheet of claim 1 wherein the peripheral edge of each of the cover panels and the peripheral edge of each of the individual posting sheetlets are each substantially straight edges extending parallel to a peripheral edge of the underlying base release sheet.

7. The multi-layer sheet of claim 1 wherein the peripheral edge of each of the cover panels and peripheral edge of each of the individual posting sheetlets are oblique to a peripheral edge of the underlying base release sheet.

8. The multi-layer sheet of claim 7 wherein the peripheral edges of the cover panels and individual posting sheetlets are angled inwardly.

9. The multi-layer sheet of claim 7 wherein the peripheral edges of the cover panels and the individual posting sheetlets form continuous curves.

10. The multi-layer sheet of claim 1 wherein each individual posting sheetlet in the multi-layer sheet ranges from about one-fourth inch to about six inches in width and about one inch to about five inches in length.

11. The multi-layer sheet of claim 10 wherein each individual posting sheetlet in the multi-layer sheet ranges from about one-fourth inch to about one and one-half inch in width and about one inch to about three inches in length.

12. The multi-layer sheet of claim 10 wherein each individual posting sheetlet is rectangular-shaped.

13. The multi-layer sheet of claim 1 wherein the adhesive is a pressure-sensitive adhesive.

14. The multi-layer sheet of claim 13 wherein each individual posting sheetlet has the pressure-sensitive adhesive extending substantially fully across the width of the individual posting sheetlet on the front face and on the back face thereof.

15. The multi-layer sheet of claim 14 wherein the adhesive extends from a top edge of the individual posting sheetlet to about 70% to about 95% the length of the posting sheetlet on both faces thereof.

16. The multi-layer sheet of claim 15 wherein the base release sheet and the removable cover sheet are silicone-coated paper sheets.

17. The multi-layer sheet of claim 1 wherein the multi-layer sheet contains at least about six individual posting sheetlets.

18. A multi-layer sheet of individual uniformly shaped staggered edge individual posting sheetlets loosely held together so as to maintain the integrity of the multi-layer sheet yet allow each individual posting sheetlet thereof to be readily removed therefrom to adhere to a substrate for temporarily posting an item thereon, said multi-layer sheet comprising:

(a) a rectangular-shaped base release sheet with four peripheral edges;

(b) at least six individual posting sheetlets in flat sheet form and arranged in a side-by-side relationship to create at least two adjoining columns of said posting sheetlets and positioned over said base release sheet, further each of the posting sheetlets in each of the columns is adjacent another posting sheetlet in the same column, each said individual posting sheetlet having a peripheral grasping edge and ranging from about one-fourth inch to about one and one-half inch in width and about one inch to about three inches in length and having a paper substrate with a front face and a back face with from about 0.4 mil to about 1 mil of a pressure-sensitive acrylic adhesive in the form of microspheres partially covering each said face in approximate aligned areas of the respective faces such that an adhesive-free area is formed and wherein the peripheral grasping edge of each said posting sheetlet is offset from one of the peripheral edges of the underlying base release sheet; and (c) a removable cover sheet having a non-stick surface with said cover sheet scored to form at least six cover panels and positioned over said individual posting sheetlets, wherein each of said scored cover panels overlies an individual posting sheetlet with a grasping edge offset from the peripheral grasping edge of the individual posting sheetlet, whereby each individual posting sheetlet can be readily grasped for removal from the multi-layer sheet and adhered to the substrate.

19. A multi-layer sheet that includes a base release sheet with a removable cover sheet of cover panels and a full sheet therebetween of a plurality of readily removable individual posting sheetlets with commonly positioned staggered edges, said multi-layer sheet comprising:

(a) a base release sheet for receiving and releasably holding a plurality of posting sheetlets in flat sheet form, the base release sheet including a release face having a surface that allows the releasable attachment thereto of pressure-sensitive-adhesive-bearing individual posting sheetlets;

(b) a plurality of individual posting sheetlets in flat sheet form arranged in a side-by-side relationship to create at least two adjacent columns of said posting sheetlets and further each of the posting sheetlets in each of the columns is adjacent another posting sheetlet in the same column and wherein the individual posting sheetlets in the flat sheet form are positioned between and in contacting relationship with each of the release faces of the base sheet and the cover sheet, each individual posting sheetlet defined by a paper substrate having a first layer of pressure-sensitive adhesive firmly adhered to and covering a portion of the front face of the paper substrate, and a second layer of pressure-sensitive adhesive firmly adhered to and covering a portion of the back face of the paper substrate, wherein each of the pressure-sensitive adhesive layers extends continuously from a top edge of the paper substrate on each of the front and back faces to a position between the top edge and a peripheral edge of the paper substrate so that each of the front and back faces of the paper substrate includes a free area that is devoid of adhesive at the bottom edge to facilitate gripping of an individual posting sheetlet for removal from the base release sheet, the adhesive layers each extending continuously between the side edges of the posting sheetlet to define on each face of the posting sheetlet a first, adhesive-bearing area and a second, adhesive-free area, and wherein the removable cover sheet and the base release sheet each covering a respective face of each of the posting sheetlets to completely cover each of the adhesive-bearing areas of each of the posting sheetlets; and (c) a removable cover sheet spaced from and in overlying relationship with the base sheet for covering pressure-sensitive-adhesive-bearing surfaces of the plurality of posting sheetlets, said removable cover sheet scored to form individual side-by-side cover panels wherein each of the cover panels overlies an individual posting sheetlet, the removable cover sheet including a release face having a surface that allows releasable attachment thereto of the pressure-sensitive-adhesive-bearing individual posting sheetlets, and further the release face of the cover sheet facing the release face of the base sheet, wherein the peripheral edge of each individual posting sheetlet is offset from an underlying edge of the base release sheet and is further offset from an overlying edge of the removable cover sheet, whereby one of said individual posting sheetlet is removed from the multi-layer sheet by removing a covering cover panel, grasping the adhesive-free area of the posting sheetlet and lifting it away from the underlying base release sheet.

* * * * *